(12) United States Patent
Böhm et al.

(10) Patent No.: US 6,367,872 B1
(45) Date of Patent: Apr. 9, 2002

(54) VEHICLE ROOF AND METHOD FOR MOUNTING SAID VEHICLE ROOF ON A VEHICLE BODY

(75) Inventors: Horst Böhm; Rainer Grimm, both of Frankfurt; Thomas Becher, Rodgan, all of (DE)

(73) Assignee: Meritor Automotive GmbH (DE)

( * ) Notice: Subject to any disclaimer, the term of this patent is extended or adjusted under 35 U.S.C. 154(b) by 0 days.

(21) Appl. No.: 09/380,792

(22) PCT Filed: Mar. 4, 1998

(86) PCT No.: PCT/DE98/00627

§ 371 Date: Dec. 7, 1999

§ 102(e) Date: Dec. 7, 1999

(87) PCT Pub. No.: WO98/39170

PCT Pub. Date: Sep. 11, 1998

(30) Foreign Application Priority Data

Mar. 6, 1997 (DE) .......................................... 197 09 016

(51) Int. Cl.⁷ .............................................. B62D 25/06
(52) U.S. Cl. .................. 296/214; 296/210; 296/216.06
(58) Field of Search .......................... 296/29, 216, 213, 296/211, 214, 215, 218, 216.01, 216.09, 216.06, 216.07; 29/897.2; 280/730.2

(56) References Cited

U.S. PATENT DOCUMENTS

| 4,811,985 A | * | 3/1989 | Kruger et al. ............... 296/214 |
| 5,005,899 A | * | 4/1991 | Clenet ......................... 296/214 |
| 5,120,593 A | * | 6/1992 | Kurihara ................. 296/211 X |
| 5,641,196 A | * | 6/1997 | Homann et al. ........ 296/214 X |
| 5,856,102 A | | 1/1999 | Bierke-Nelson et al. |
| 5,939,259 A | | 8/1999 | Harvey et al. |
| 5,985,327 A | | 11/1999 | Burgoyne |
| 6,019,411 A | * | 2/2000 | Carter et al. ............. 296/215 X |
| 6,079,735 A | * | 6/2000 | Fallmann et al. ........ 280/730.2 |
| 6,120,090 A | * | 9/2000 | Van Ert et al. ............. 296/211 |
| 6,129,413 A | * | 10/2000 | Klein ..................... 296/214 X |
| 6,173,990 B1 | * | 1/2001 | Nakajima et al. ....... 296/214 X |
| 6,227,561 B1 | * | 5/2001 | Jost et al. ................ 280/730.2 |
| 6,273,500 B1 | * | 8/2001 | Boersma et al. ....... 296/216.09 |
| 2001/0003400 A1 | * | 6/2001 | Grimm et al. .......... 296/214 X |

FOREIGN PATENT DOCUMENTS

JP 0194163 A * 11/1982 ................. 296/214

OTHER PUBLICATIONS

"Plastics Handbook", edited by Modern Plastics, 1994, McGraw–Hill, Inc.*

* cited by examiner

Primary Examiner—Joseph D. Pape
Assistant Examiner—Jason Morrow
(74) Attorney, Agent, or Firm—Carlson, Gaskey & Olds

(57) ABSTRACT

A vehicle roof includes a preformed inner shell forming the roof lining. The lining is larger than the inside dimensions of the body opening bounded by the rails or sections of the closed body frame. The roof lining is flexible or elastic on the protruding areas, so that it is bendable for passage through the body opening bordered by the vehicle frame, with partial folding in the corner areas downward without permanent deformation and is designed to cover the vehicle frame. The protruding areas of the roof lining therefore form the coverings for the roof frame sections so that additional cover strips and cover sections are not required, even in the corners.

31 Claims, 15 Drawing Sheets

VEHICLE ROOF AND METHOD FOR MOUNTING SAID VEHICLE ROOF ON A VEHICLE BODY

BACKGROUND OF THE INVENTION

This invention relates generally to a vehicle roof. More particularly, this invention relates to a method for assembly of the. vehicle roof on an auto body frame.

In ordinary vehicle bodies, the vehicle roof, which can have a roof opening for a sunroof and can be connected to a movable cover or folding roof. The vehicle roof is typically a fixed component integrated in the auto body, which is directly connected to the columns of the body. The roof lining in such bodies commonly includes cladding parts, as well as other vehicle parts such as sun visors, hand grips and, if present, sliding or folding roof elements. The components must be subsequently mounted typically from the vehicle interior.

Vehicle roofs have already been proposed that are produced as modules separate from the vehicle body and mounted with their outer edges on body frames applied to the body columns and rigidly connected to them by gluing or screwing. For example, one known vehicle roof (DE 28 45 708 A1) is designed as a preformed sandwich plate, having a roof skin on the outside and a cushion and/or coating material as roof lining on the inside. The assembly times on the final assembly line are shortened by preassembly. However, edge-spanning outer cover strips and the covering sections that clad the rails of the roof frame from the inside must still be applied. This increases assembly time.

Another known modular-design vehicle roof (FR 2 529 844), which has an inner covering formed from a foam material is provided in one piece with four flaps. The flaps are connected to the central area of the internal covering via hinges and is not designed like the generic vehicle roof for mounting on a closed body frame, but is placed on two longitudinal side rails of the body. The vehicle roof therefore has integrated hollow elements on the front and back with protruding edges to accommodate the windshield and rear window. The flaps of the internal covering are shape-stable and serve for lateral cladding of the longitudinal rails and to cover the roof edges and upper edges of the windows in the front and back. During assembly of this known vehicle roof, only the two side flaps are to be pivoted downward/inward, in order to be passed between the two longitudinal side rails, when the vehicle roof is mounted. The front and rear flaps serve as assembly aids during subsequent insertion of the front and rear windows. After assembly, cutouts remain on the corners between the flaps that must still be closed by additional cover elements.

SUMMARY OF THE INVENTION

In general terms, this present invention is a vehicle roof with a preformed inner shell forming the roof lining. The lining protrudes on all sides beyond the outside edges of the vehicle roof including the corners, i.e., the lining is larger than the inside dimensions of the body opening bounded by the rails or sections of the closed body frame. The roof lining is flexible or elastic on the protruding areas, so that it is bendable for passage through the body opening bordered by the vehicle frame, with partial folding in the corner areas downward without permanent deformation and is designed to cover the vehicle frame. The protruding areas of the roof lining therefore form the coverings for the roof frame sections so that additional cover strips and cover sections are not required, even in the corners.

The separately produced vehicle roof according to the present invention embraces, in a one-part design, all the elements that are required to cover the visible surfaces of the body frame after mounting and attachment of the vehicle roof to the body frame or frames. The actual roof lining then grades seamlessly into areas that serve for roof frame covering. The invention therefore permits short assembly times on the final assembly line because of the one-part nature of the modular, separately produced vehicle roof with the covering areas of its lining. The invention also achieves a seamless harmonic configuration of the entire roof lining, even in its transitional surfaces to the glazed surfaces of the vehicle body, i.e., to the windshield, side windows and rear window, and also in its corner areas.

The vehicle roof of the present invention includes many variants. In one embodiment, it can be provided with an outer roof skin, preferably a rigid roof skin formed, for example, from a steel sheet. In another, it can be formed from appropriate hard foam or other roof skin. In the latter case, the outside can be painted like the auto body. Another embodiment requires the presence of a rigid roof skin, whose outer edges can be mounted directly, i.e., without an intermediate foam layer, on the roof frame and fastened to it.

Yet another embodiment can be provided with an already functional preassembled sliding roof unit. The roof lining preformed as an inner shell is attached to the bottom of the sliding roof frame. The inner surface of the roof skin can be additionally coated with a foam material in the regions adjacent to the sliding roof opening to improve sound and heat insulation.

PUR foam is preferred for formation of the inner shell, which is sufficiently flexible for the purposes of the invention or can even be made elastic. Predetermined folds that facilitate temporary bending downward and folding on the four corners of the vehicle roof can also be provided. Harder foam materials can also be applied for those areas of the inner shell for which flexibility is not required. This applies especially for the case in which the vehicle roof has no rigid supporting outer skin.

Downward bendable areas of the inner shell according are also provided with preassembled elements or prefabricated mounting sites for such elements. The assembly cost on the assembly line is further simplified on this account because the corresponding elements can either be mounted at the sites prescribed for them or even already be present preassembled on the modular vehicle roof.

In the interest of the most extensive possible prefabrication of the vehicle roof without requiring subsequent adjustment work on the body frame, a vehicle roof prefabricated in this manner can be joined to the body frame on all four sides without difficulty. If the vehicle roof is to be exclusively joined to the body frame by gluing or screw connections, the roof edges are expediently configured thereto.

Reinforcement parts ensure stiffening of the vehicle roof and therefore serve not only for transportability and manageability of the preassembled vehicle roof, but also for its stiffening after assembly on the body frame. The reinforcement parts embedded in foam material prescribed for this purpose need not be fully enclosed by the foam material, but can be exposed on their lower surfaces so that they can be flatly mounted directly on the vehicle frame for fastening.

In the design of a vehicle roof with a sliding roof, water that enters through the edge gap of the sliding roof and is trapped by the sliding roof frame can advantageously be diverted outward. A water runoff seam is expediently provided, in this case, between the outer edge of the roof skin and the body frame.

According to a method of the present invention bent position of the regions of the inner shell involved in assembly are temporarily fixed and fixation is eliminated after passage of the bent regions through the body frame and attachment of the vehicle roof to the body frame. For example, for temporary fixation, it is sufficient if the downward bent regions of the inner shell are tied together by a flexible band or cord or the like, placed around these regions from the outside.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
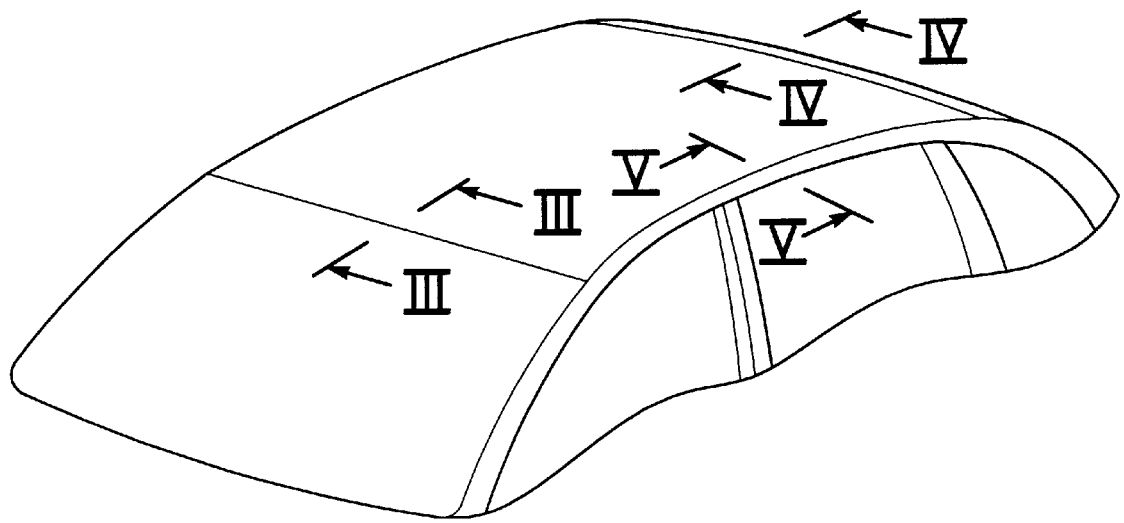
FIG. 1 shows a schematic perspective view of a passenger vehicle roof already mounted on a car body.
Figure 2:
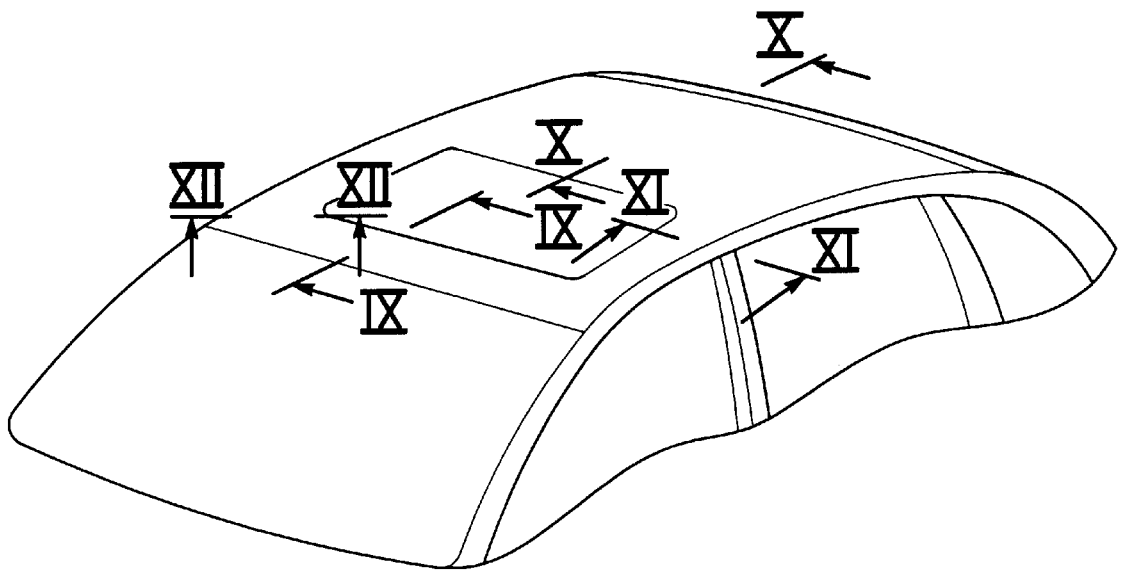
FIG. 2 shows a perspective view corresponding to FIG. 1, but with a sliding roof unit incorporated in the vehicle roof.
Figure 3:
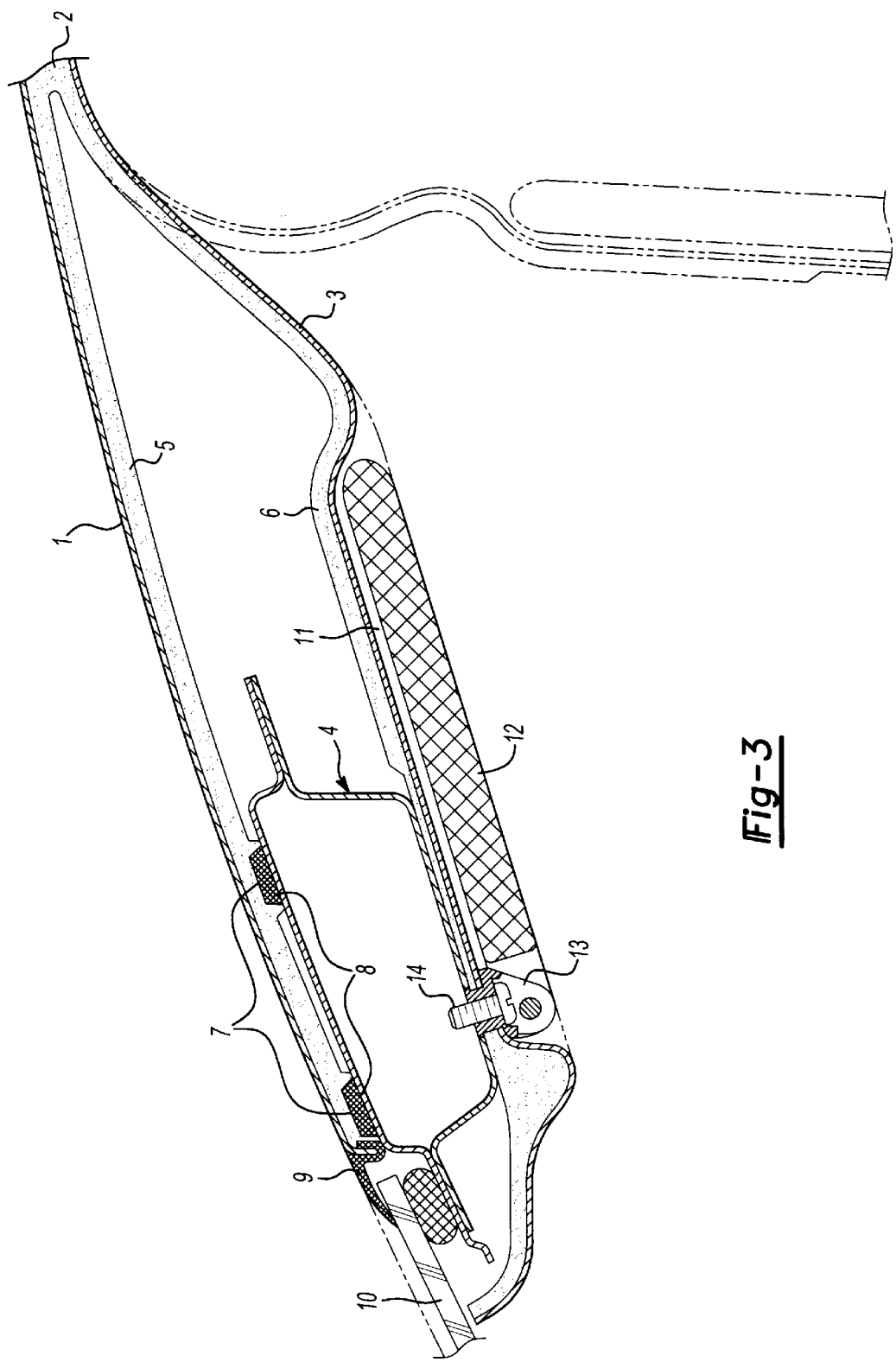
FIG. 3 shows a broken section corresponding to line III—III in FIG. 1 concerning a first variant.
Figure 4:
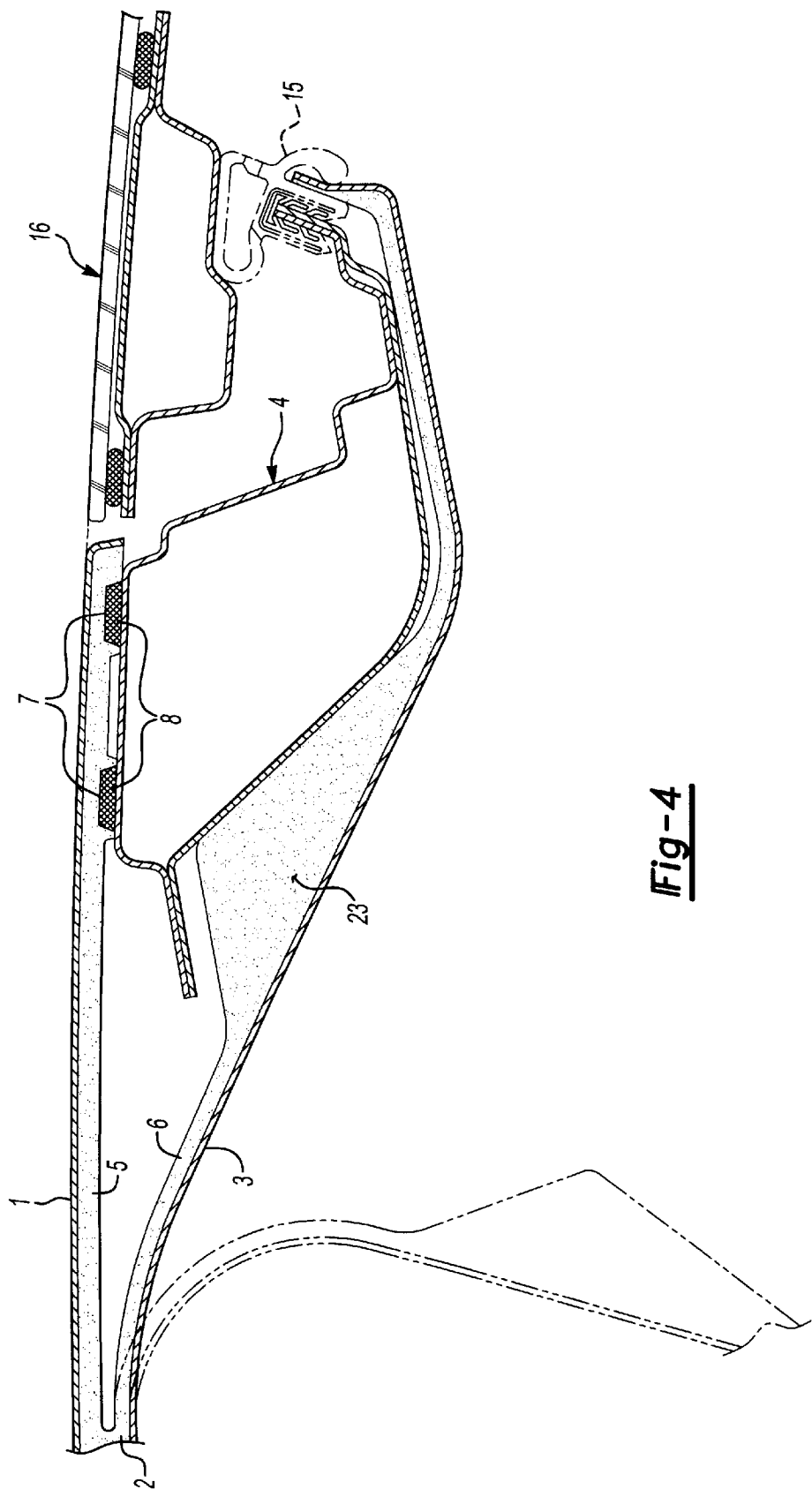
FIG. 4 shows a broken section corresponding to line IV—IV of FIG. 1 concerning the first variant.
Figure 5:
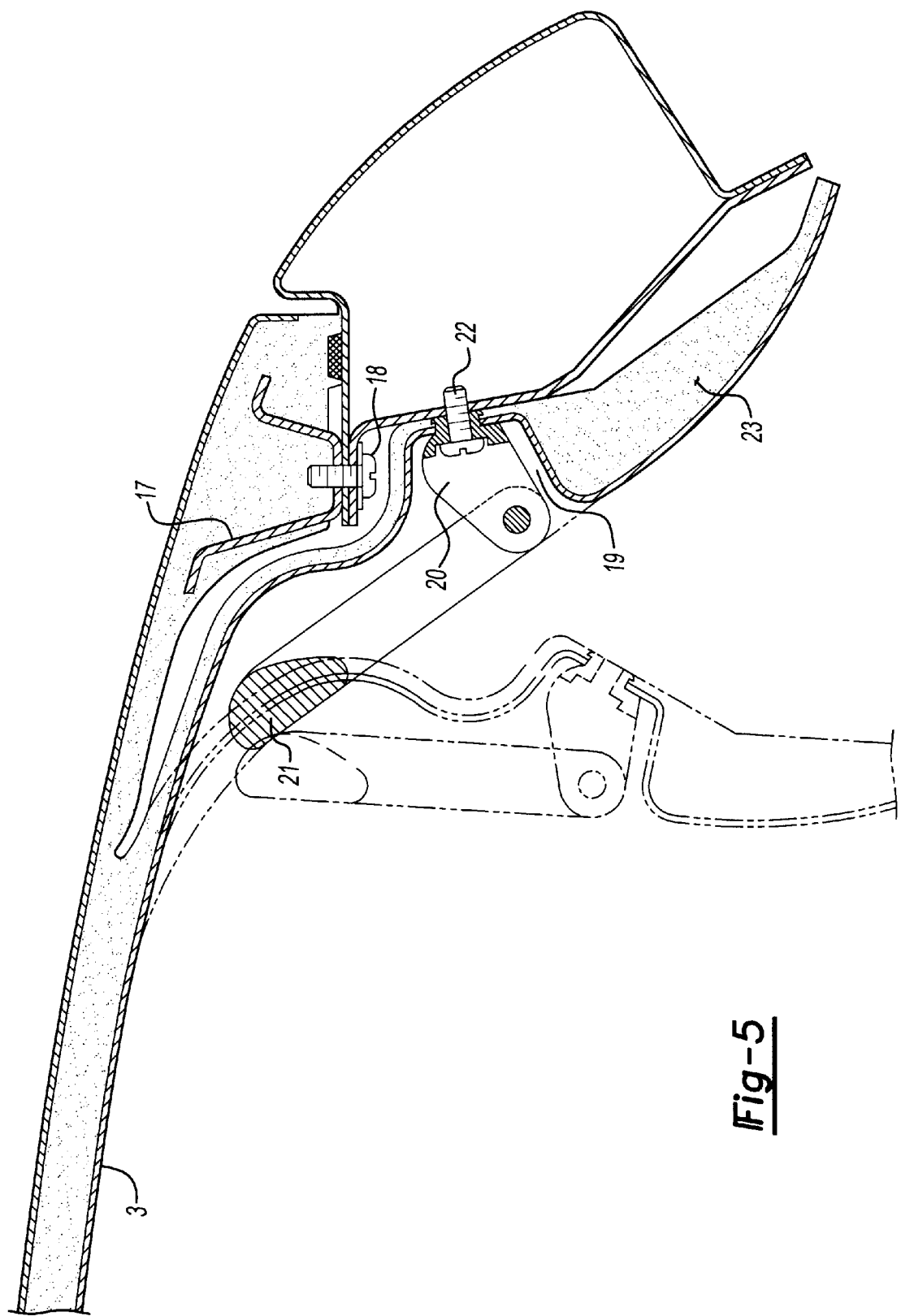
FIG. 5 shows a broken section corresponding to line V—V in FIG. 1 concerning the first variant.

FIGS. 3 to 5 will initially be referred to for further explanation of the first variant of the vehicle roof. The vehicle roof apparent from these figures consists of an outer shell or roof skin 1 formed from a metallic material, for example, a steel sheet, and an inner shell 2 connected to it in sandwich fashion, which is formed from a foam plastic, for example, a PUR foam. The inner surface of inner shell 2 is coated with a textile or film-like coating material 3 to form the roof lining. As in all sectional views shown and described here, the incorporation state of the vehicle roof is depicted, in which the outer edges of the roof are positioned on body frame 4. In FIG. 3 the front cross spar is shown, in FIG. 4 the rear cross spar and, in FIG. 5 one of the side rails of the body frame 4.

The inner shell 2 is divided into two layers in the region of the outer edges provided for mounting on the body frame 4, the upper layer 5 of which is positioned on the body frame 4, while the lower layer 6 protrudes beyond the outer edges of the vehicle roof. The lower layer 6 is downward-bendable without permanent deformation for passage through the body opening bordered by the body frame 4, as shown in the figure with the dash-dot lines. This downward bendable lower layer 6 is positioned on the downward and inward-facing surfaces of the body frame 4 and fastened to them in a manner to be described later.

The upper layer 5 is provided with mounting grooves 7 for adhesive 8 molded into the foam in the region of its mounting on body frame 4. In this fashion, the vehicle roof is rigidly connected to body frame 4. In the front region a lip profile 9 is mounted on a beveling of the outer shell 1, which lies against windshield 10. The lower layer 6 covers body frame 4 fully and is provided in its front region with recesses 11 that accept pivotable sun visors 12. The swivel pivot brackets 13 of sun visors 12 are locked in corresponding recesses in the lower layer 6 and cover material 3, which permits preassembly of the sun visors on the inner shell. After covering of the body frame 4, fastening screws 14 are screwed into the body frame 4 through the swivel pivot brackets.

Figure 11:
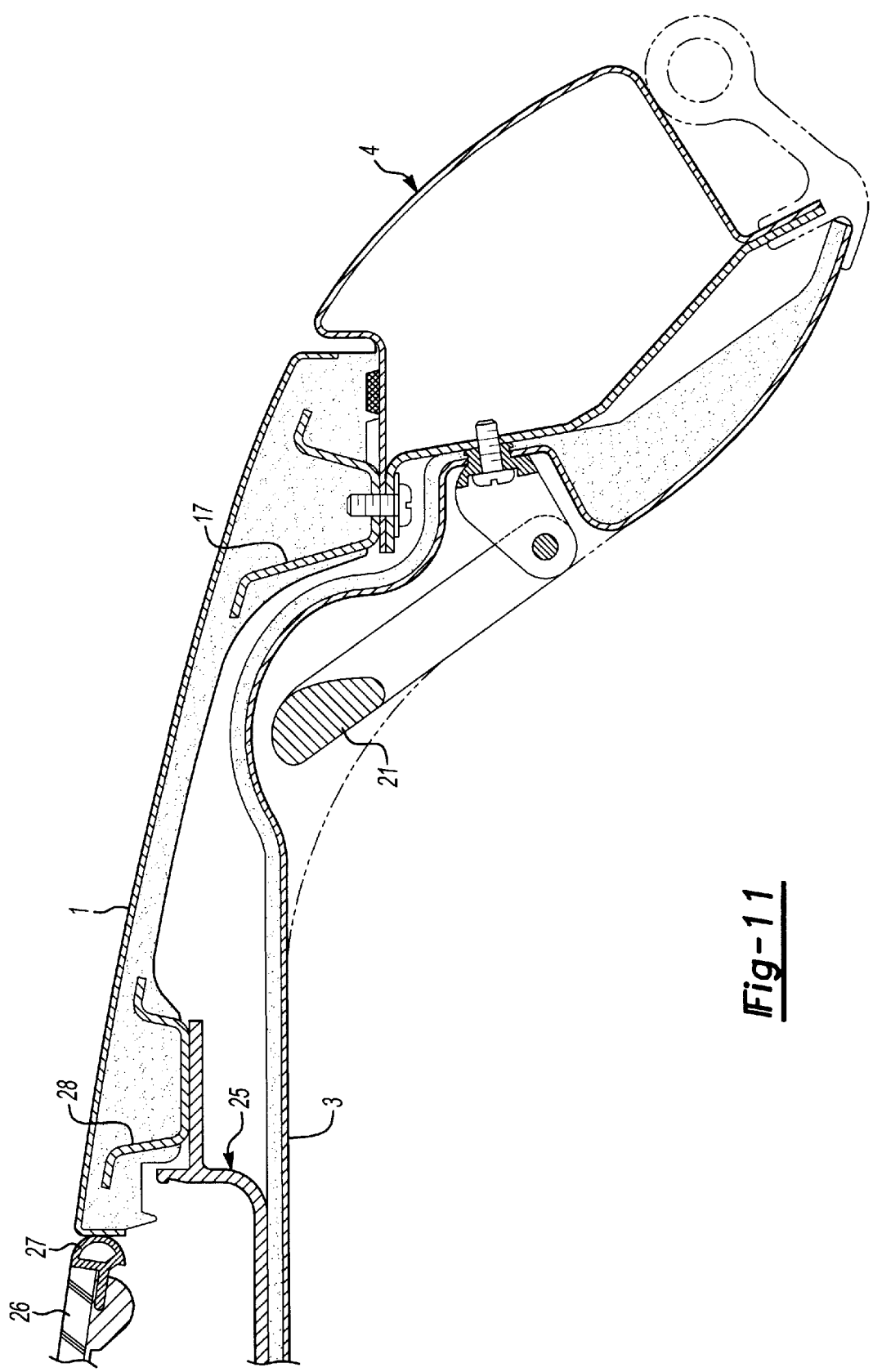
FIG. 11 shows a broken section corresponding to line XI—XI in FIG. 2 concerning a third variant.

The lower layer 6 is in contact with the rear cross spar of body frame 4 apparent from FIG. 4 and rigidly joined to it via a weatherstrip 15 mounted both on a flange of the cross spar and on the outer edge of the lower layer 6. The weatherstrip depicted with the dash-dot lines in FIG. 4 is simultaneously the sealing profile for the tailgate 16 provided in this practical example. As follows from FIG. 5, a reinforcement part 17 is embedded in the foam in the form of a continuous profile on the sides of the vehicle roof in the upper layer 5. The lower surface of the reinforcement part 17 lies flatly against the body frame. Here the vehicle roof is rigidly connected to the side rails of, the body frame through fastening screws 18, which are passed through a flange of the body frame 4 and screwed into the reinforcement part 17. This attachment occurs before covering of the body frame 4 with the lower layer 6 of inner shell 2, which is also shown bent downward in FIG. 5 with dash-dot lines. A mounting groove 7 for adhesive 8 is made on the outside in the foam of the upper layer 5. FIG. 5 also shows that swivel pivot brackets 20 for support strap 21 in corresponding holes of the lower layer 6 and cover material 3 are snapped into recesses 19 of lower layer 6. The support strap 21 with its swivel pivot brackets 20 can therefore be preassembled on the vehicle roof. As was already described with reference to FIG. 3 concerning the sun visors 12 depicted there, fastening screws 22 are passed through the swivel pivot bracket 20 and screwed into the body frame 4 in the hand grips 21. In addition to this fastening, the outer edge of lower layer 6 is connected to a corresponding flange of body frame 4 through a weatherstrip (not shown here), as indicated with the dash dot lines in FIG. 11 at this site.

As also follows from FIGS. 3 to 5, the lower layer 6 is not made of uniform thickness, but is designed thick-walled in partial regions corresponding to stability or cushioning requirements. By the corresponding design of the manufacturing mold, such different layer thicknesses can be achieved without problem. It is also apparent from the figures that significant cavities are situated between the upper layer 5 and the lower layer 6 of inner shell 2. These can be used as channels to accommodate cables, but also as air channels. The outer edges of the downward bendable regions of inner shell 2, i.e., the lower layer 6 in the variant in question, are cut or premolded to size according to their prescribed attachment on body frame 4. The already mentioned layer thickenings of lower layer 6 form, as is clearly apparent from FIGS. 4 and 5, in particular, shock-absorbing safety elements 23, which prevent direct collision of passengers body parts on body frame 4 in these regions or lessen the consequences of collision.

Figure 6:
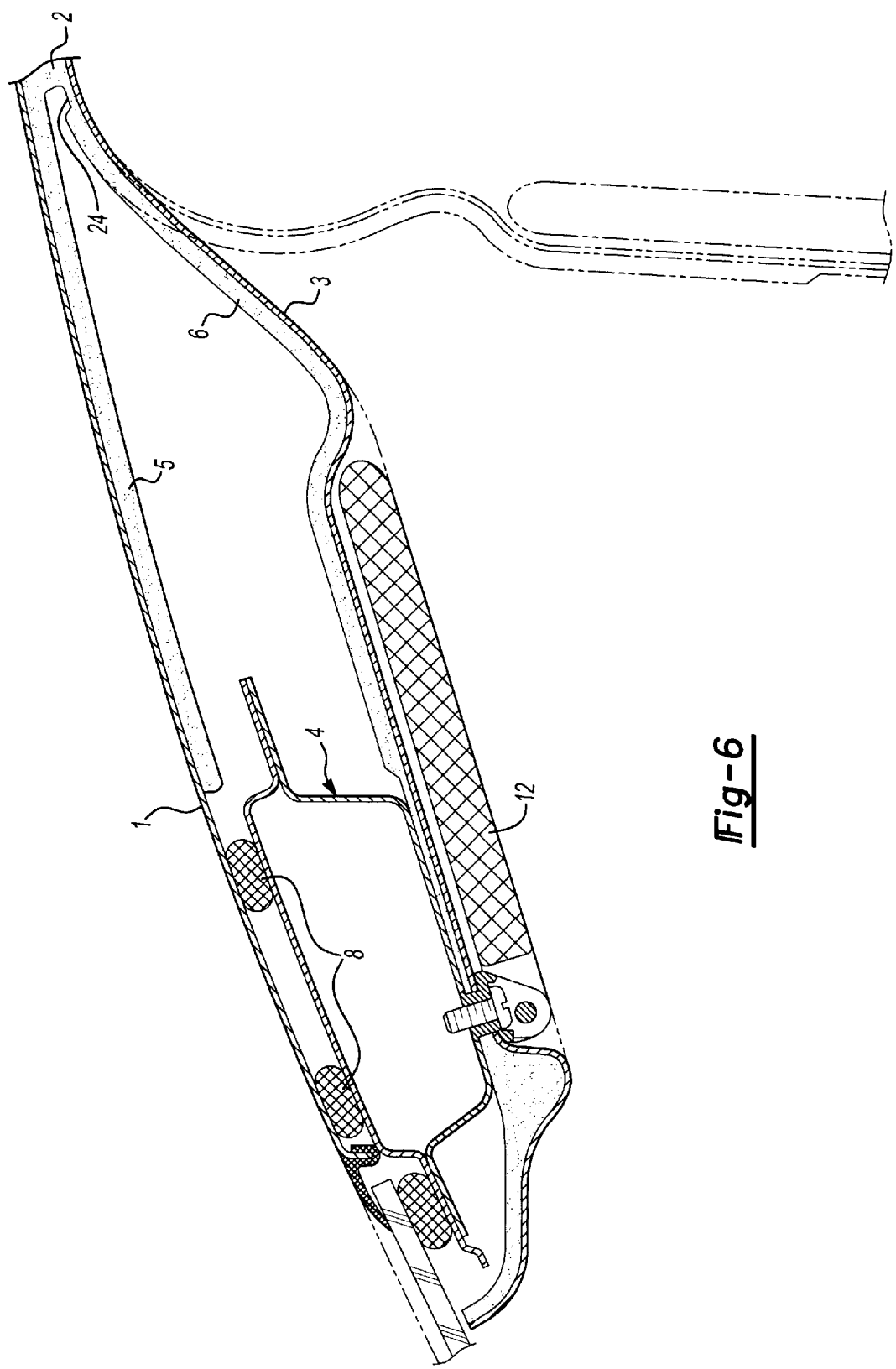
FIG. 6 shows a section similar to FIG. 3 concerning a second variant.
Figure 7:
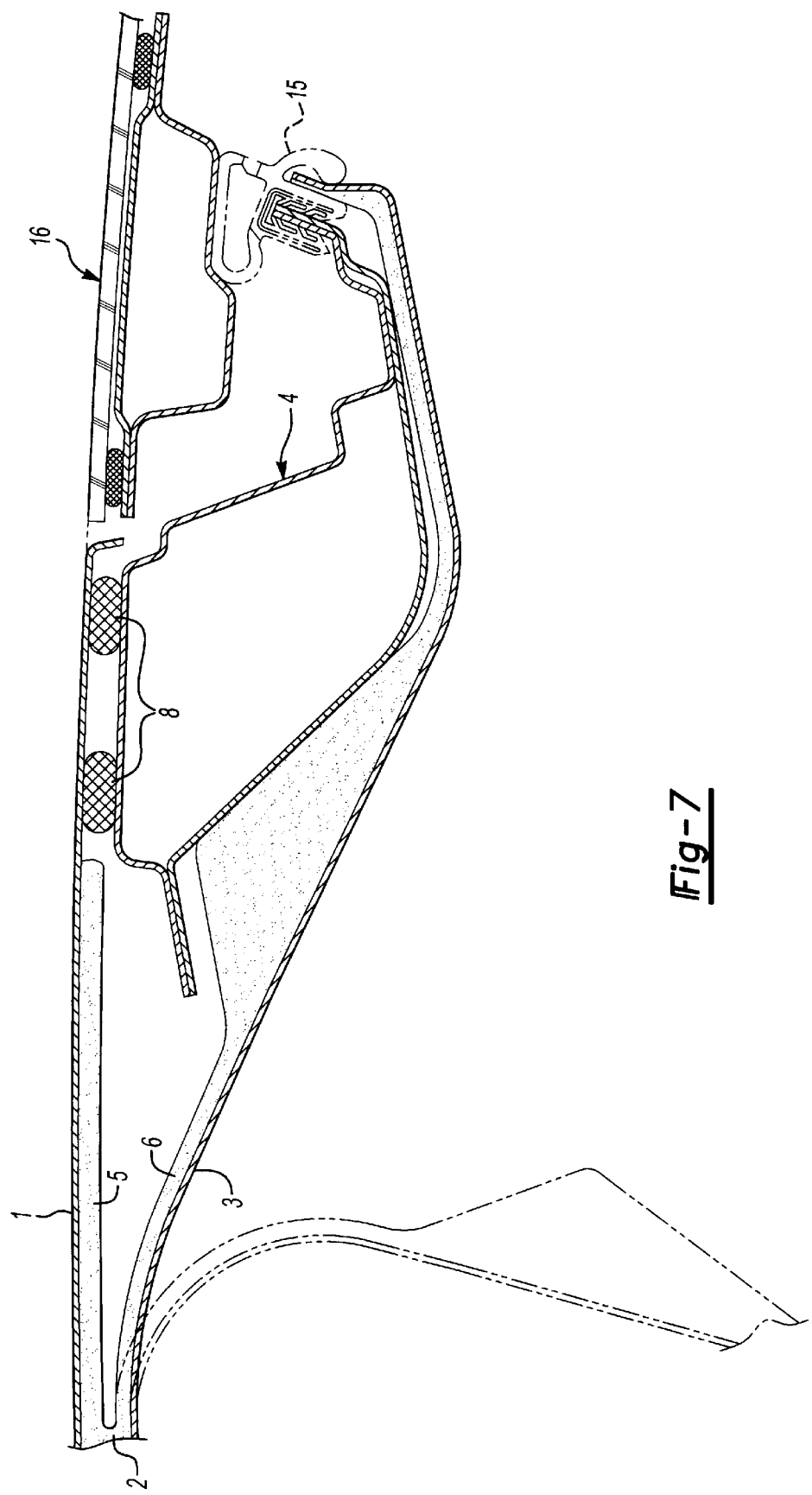
FIG. 7 shows a section similar to FIG. 4 concerning second variant.
Figure 8:
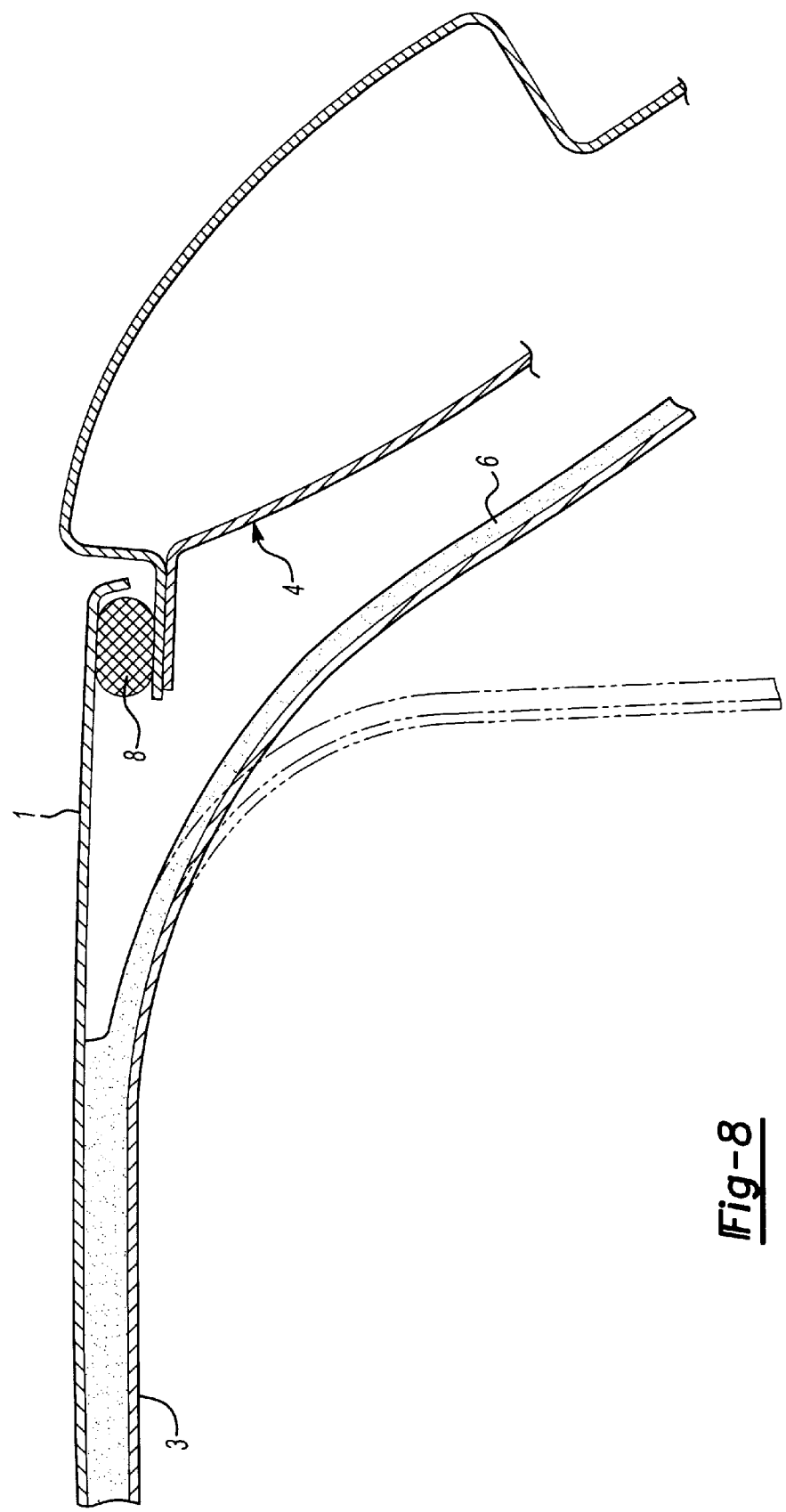
FIG. 8 shows a section similar to FIG. 5 concerning a second variant.
Figure 9:
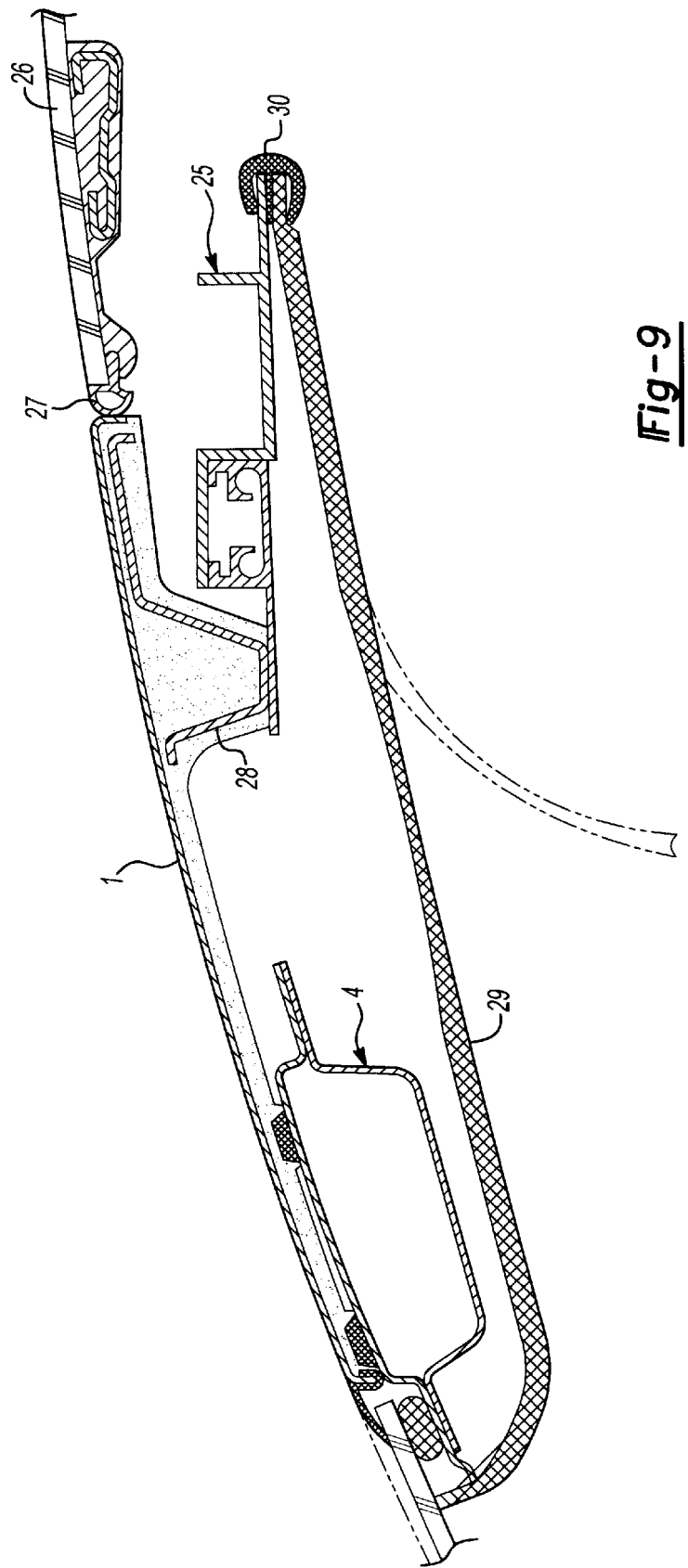
FIG. 9 shows a broken section corresponding to line IX—IX in FIG. 2 concerning a third variant with incorporated sliding roof.
Figure 10:
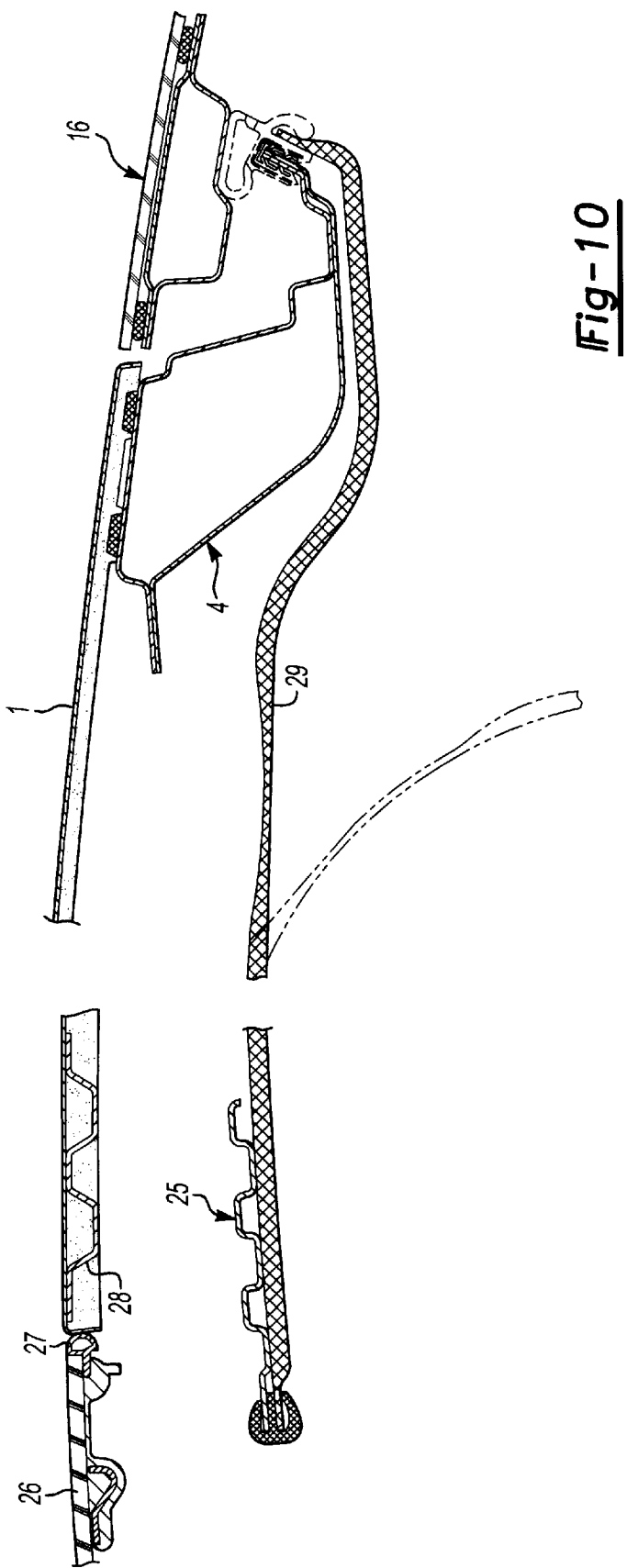
FIG. 10 shows a broken section corresponding to line X—X in FIG. 2 concerning a third variant.

For further explanation of the second variant, reference is now made to FIGS. 6 to 8, in which only the differences relative to the first variant according to FIGS. 3 to 5 will be mentioned. Whereas in the first variant the inner surface of roof skin 1 is fully foamed, there is no foaming in the second variant in the region of the outer edges of the rigid roof skin 1 intended for mounting on body frame 4. The upper layer 5 ends in the front and rear (FIGS. 6 and 7) with a spacing from the outer edges of the vehicle roof, but can also be completely absent in this region, so that only a thinner underlying layer 6 continues from inner shell 2, as follows from FIG. 8. In any event, the inner shell situated beneath roof skin 1 is not connected to roof skin 1 in the region of mounting on body frame 4. The inner shell extending beyond the outside edges of the vehicle roof is again downward-bendable without permanent deformation for passage through the body opening bounded by body frame 4 and serves for the already described covering of body frame 4. Whereas in the first practical example according to FIGS. 3 to 5 a rigid roof skin 1 is not absolutely essential, if the inner shell 2 has sufficient shape stability, in the practical example according to FIGS. 6 to 8, a rigid supporting roof skin 1 is absolutely essential. Connection of roof skin 1 and thus the entire vehicle roof to body frame 4 is also assumed here by adhesive 8 applied in beads. In this second variant it is shown in FIG. 6 on the division side of the upper layer 5 and lower layer 6 that notch-like recesses 24 can be provided on the bending or folding sites on the side facing away from the lining surface, which significantly facilitates temporary bending of the lower layer 6. Corresponding recesses can also be provided in the other variants.

The third variant is now further described with reference to FIGS. 9 to 12. The peculiarity of this variant consists of the fact that a preassembled sliding roof unit is situated in the vehicle roof of this, the mentioned figure shows essentially the sliding roof frame 25, the sliding cover 26, designed, for example, as a glass cover, the edge gap sealing profile 27 and a reinforcement frame 28 surrounding the roof opening made in the rigid roof skin 1. In the depicted example the rigid roof skin 1 is foamed and mounted in the already described manner with its edge regions on the body frame 4 and rigidly connected to it. In this third practical example the roof lining, preformed as inner shell 29, is mounted with a spacing relative to rigid roof skin 1 on the sliding roof frame 25 fastened beneath roof skin 1. The inner shell 29, again protruding beyond the outer edges of the vehicle roof, is downward-bendable without permanent deformation for passage through the body opening bounded by body frame 4 and designed to cover the body frame 4 and the sliding roof frame 25. Whereas the mounting and attachment of inner shell 29 on body frame 4 occurs in the already described manner, attachment of the inner shell 29 to the sliding roof frame 25 is assumed by a mounting weatherstrip 30, which is mounted both on a flange of sliding roof frame 25 and on the opening edge of inner shell 29, as follows from FIGS. 9, 10, and 12. This figure also shows the downward bent assembly position of inner shell 29 in dash-dot lines. Whereas FIGS. 9, 10 and 12, by omission of the covering material 3, indicate that the inner shell 29 can be designed without covering material on its surface facing the vehicle interior, FIG. 11, pertaining to this third variant, clarifies, however, that the covering material 3 can also be present here.

Figure 12:
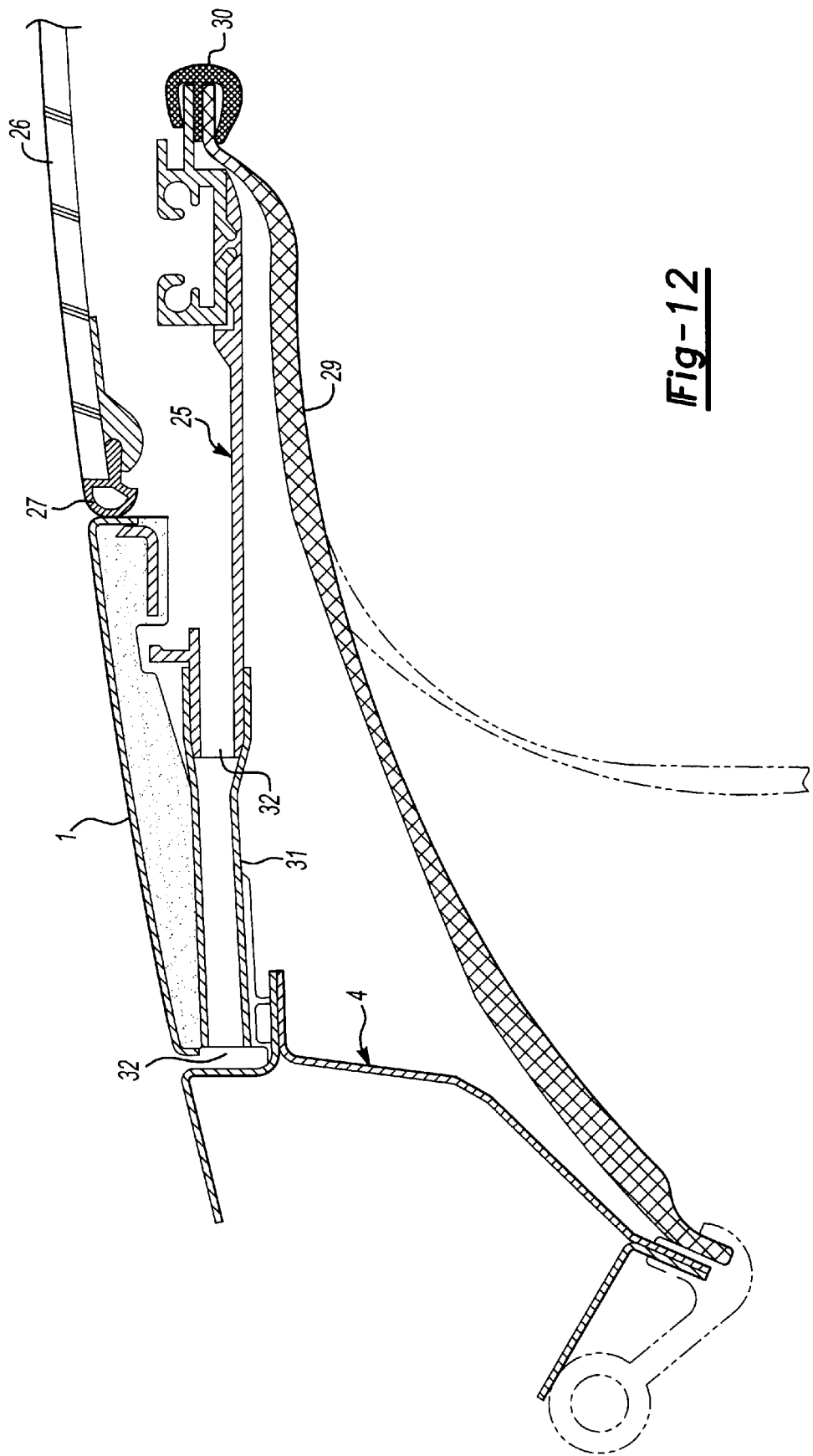
FIG. 12 shows a broken section corresponding to line XII—XII in FIG. 2 concerning a third variant.

The manner in which water entering via the edge gap between rigid roof skin 1 and sliding cover 26 and trapped by the sliding roof frame 25 can be diverted outward follows from FIG. 12. For this purpose, a tube piece 31 is embedded in the foam layer applied to the bottom of the rigid roof skin 1, which, on the one hand, is mounted tightly on a outflow spout 32 of the sliding roof frame 25 and, on the other hand, ends with an opening on the outer edge of the vehicle roof. The tube piece 31 discharges here into a water outflow spout 32, which is formed between the outer edge of the roof skin and the surface of the body frame 4 facing it.

Figure 13:
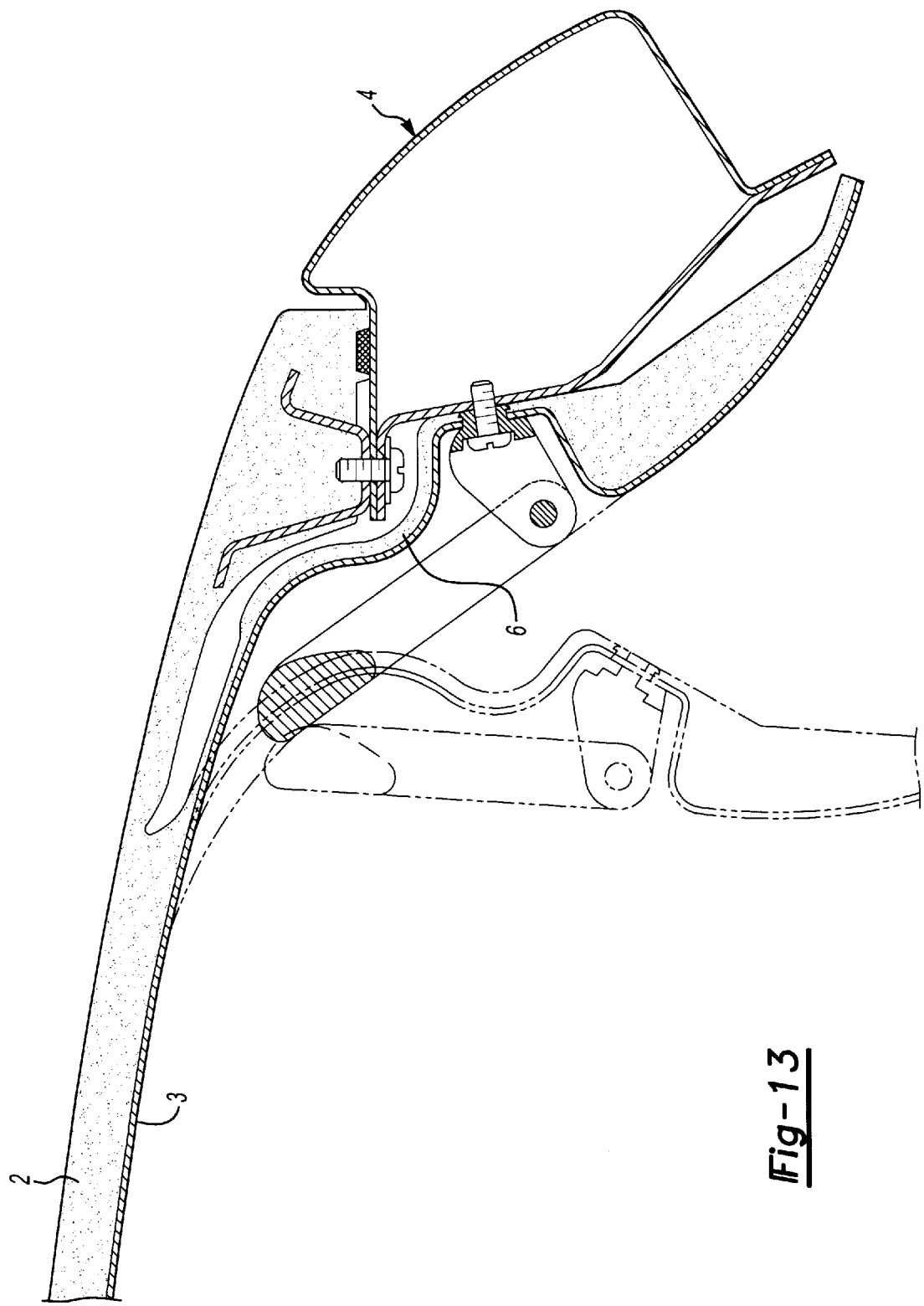
FIG. 13 shows a section similar to FIG. 5 concerning a fourth variant, shown only with this figure.

The fourth practical example, which is shown in FIG. 13, corresponds essentially to the first practical example already described at length with reference to FIGS. 3 to 5. In contrast to this, the fourth variant has no rigid roof skin. The vehicle roof here consists essentially of a hard shell-like foam plastic with a smooth, paintable outer surface. Naturally, additional reinforcements guided in the transverse direction and in the longitudinal direction can be embedded in the foam plastic. The inner shell 2 is simultaneously the outer shell.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

Figure 14:
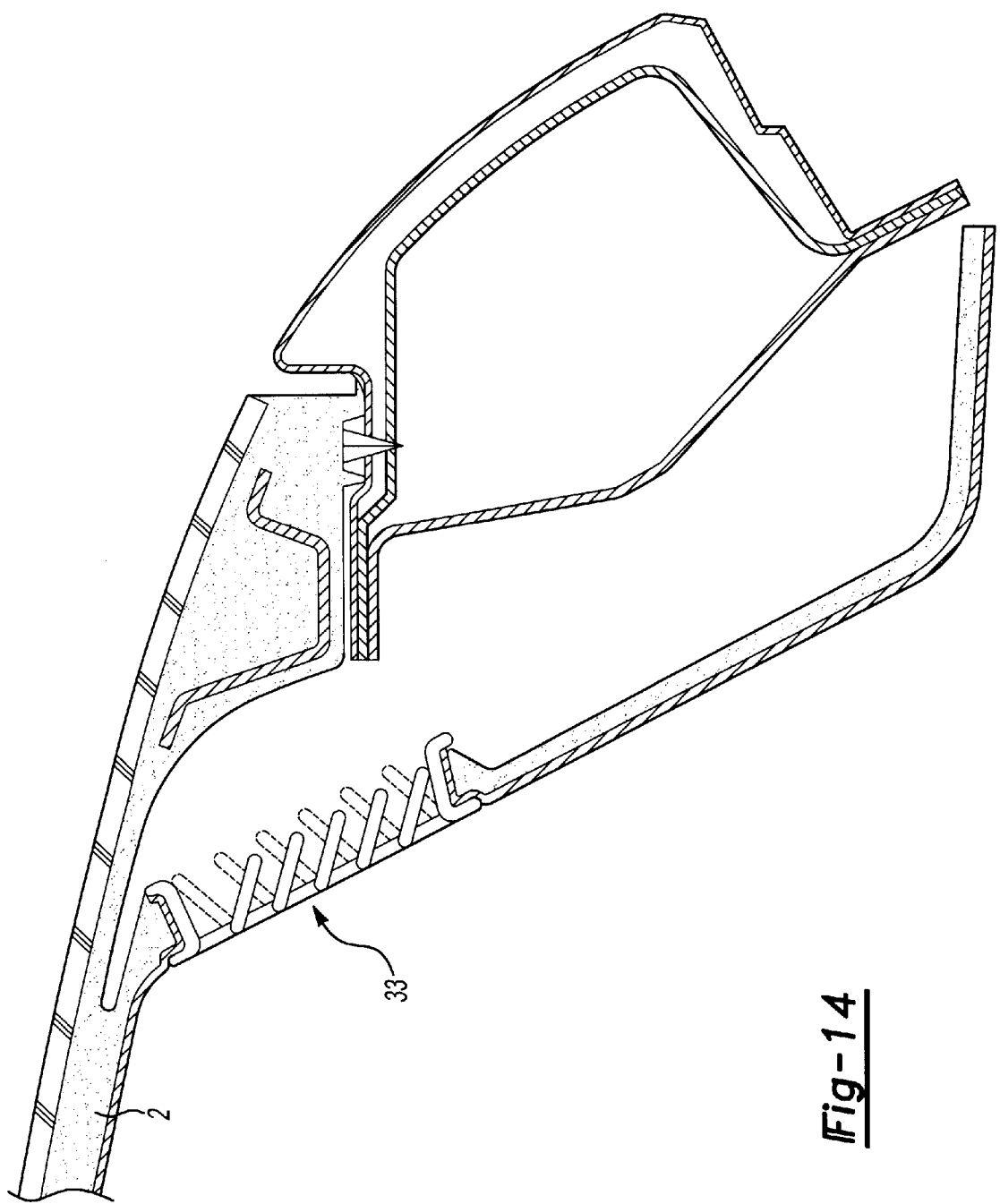
FIG. 14 shows a section similar to FIG. 5 concerning a fifth variant, shown only in FIGS. 14 and 15.
Figure 15:
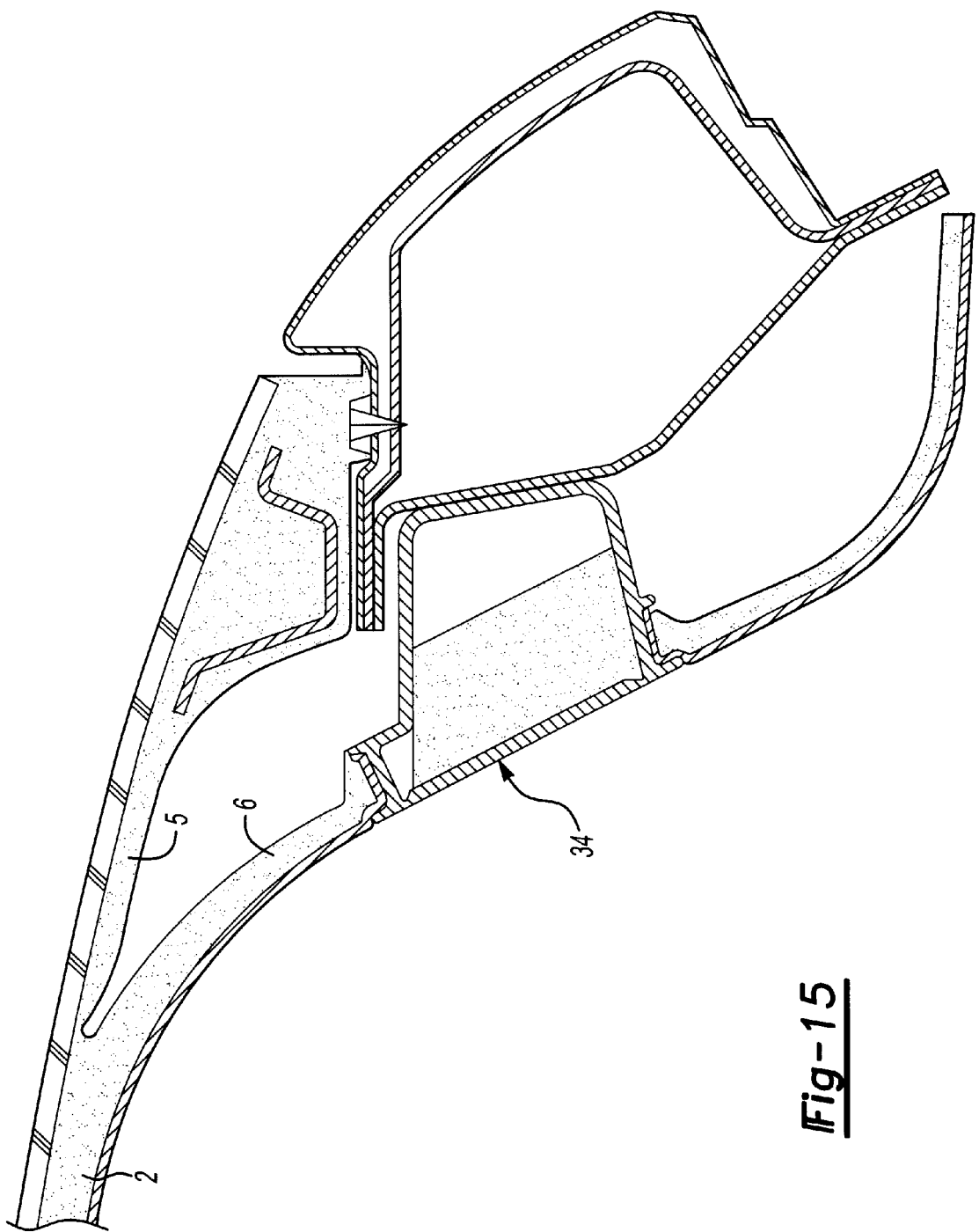
FIG. 15 shows a section similar to FIG. 14 concerning another equipment detail of the fifth variant.

Finally, the fifth practical example is apparent from FIGS. 14 and 15. The fifth practical example does not differ fundamentally from the first practical example described with reference to FIGS. 3 to 5, with the exception that the thin roof skin 1 here is replaced by a thicker roof skin formed from a transparent plastic or glass. However, this figure also shows that not only can sun visors or hand grips be preassembled on the lower layer 6, but also ventilation grates 33. (FIG. 14) and even airbags 34 (FIG. 15). The same also applies to the third practical example described as reference to FIGS. 9 to 12. Here the preassembled elements, like sun visors, hand grips, ventilation grates, shock-absorbing safety elements, airbags and the like, are preassembled on inner shell 29.

Figure 16A:
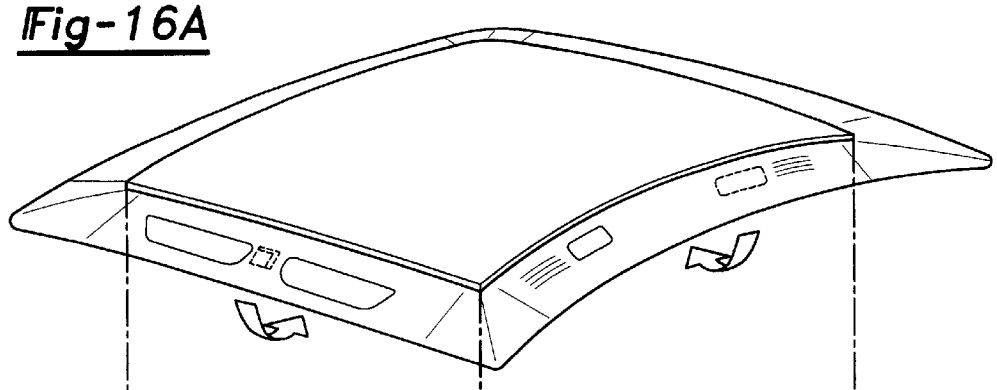
FIG. 16A shows a perspective view of the vehicle roof before incorporation, explaining the assembly process.
Figure 16B:
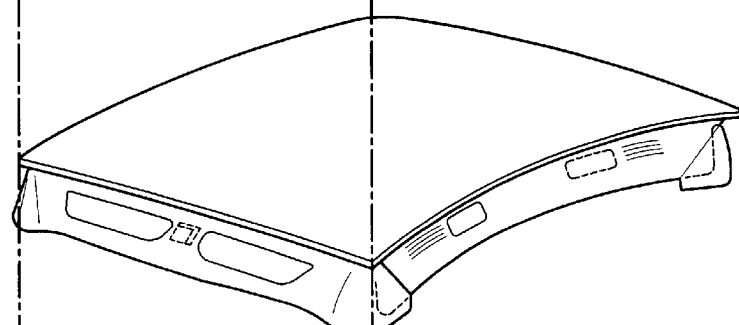
FIG. 16B shows the vehicle roof according to FIG. 16A, but ready for incorporation with the downward bent regions of the roof lining or inner shell.
Figure 16C:
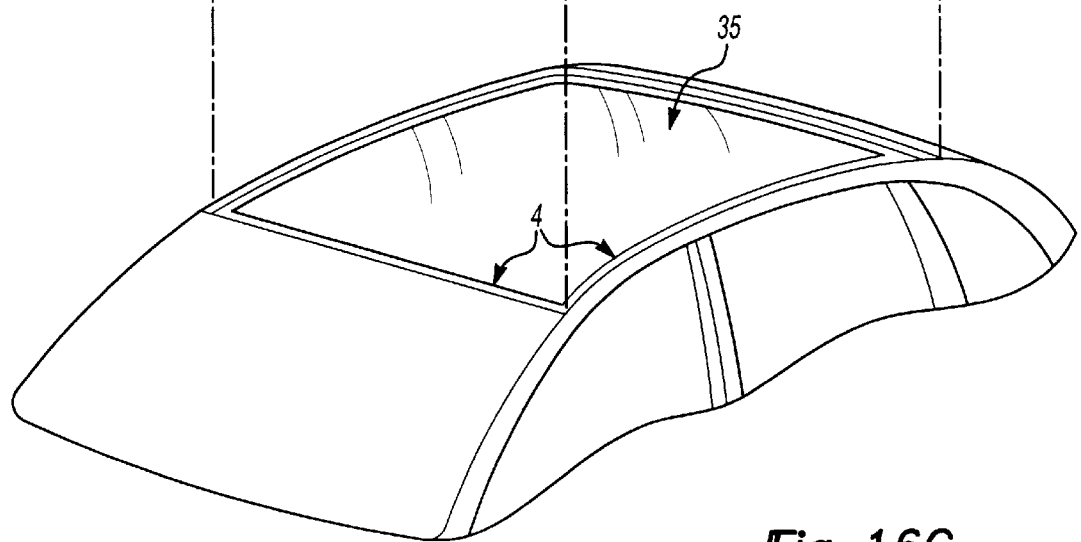
FIG. 16C shows a perspective view of the passenger car body before roof assembly.

The assembly method for the described vehicle roof, which is the same for all variants of the vehicle roof, is described below with reference to FIGS. 16A to 16C. The vehicle roof produced separately from the rest of the vehicle body, with all its preassembled elements on the inner shell, initially has roughly the appearance shown in FIG. 16A. The regions of the inner shell extending beyond the outer edge of the vehicle roof are readily apparent. The inner shell or the lower layer of the inner shell protruding beyond the outside edges of the vehicle roof is now bent downward with partial folding in the corner regions, as the arrows in FIG. 16A show. A nonpermanent deformation occurs in this case as does partial folding of the protruding inner shell or lower layer of the inner shell in the corner regions. The vehicle roof then assumes roughly the shape depicted in FIG. 16B. To facilitate introduction of the now apron-like drooping regions of the inner shell or lower layer of the inner shell into the body opening 35 formed by the body frame 4, the drooping regions and thus the bent position of these regions can temporarily be fixed by a band, cord or the like positioned peripherally. After mounting of the vehicle roof on the body frame 4, attachment of the vehicle roof to the body frame initially occurs, in which the temporary fixation can still be retained. Fixation is then optionally removed, the inner shell or the lower layer of the inner shell, bent back with its regions designed to cover the body frame 4, is positioned on the downward and inward-facing surfaces of the body frame and finally fastened to the body frame, as was explained in detail with reference to the sectional depictions.

A vehicle roof module produced separately from the vehicle body and an assembly method are proposed, in order to shorten the assembly time on the assembly line of an automobile plant. The peculiarities of the roof module produced in the different variants consist essentially of the fact that the roof lining, designed as an inner shell, protrudes on all sides beyond the outer edges of the roof surface, that the protruding regions form the coverings for the body frame 4, that all otherwise subsequently mounted elements, like sun visors, hand grips, ventilation grates, interior lights, safety elements, airbags, etc., can already be preassembled in the protruding regions, and that the protruding regions can be temporarily bent downward without permanent deformation for mounting of the module roof on the body frame and passage through the body opening bounded by the body frame, until bending back is possible and covering of the body frame is carried out.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A vehicle roof, comprising:
   an outer shell mountable to a vehicle body;
   an inner shell adjacent said outer shell, said inner shell having an outer edge defined by an upper layer mountable to said outer shell and a lower layer extending continuously about an outer periphery defined by said outer shell; and
   a flexible portion of said lower layer passable through an opening in the vehicle body during mounting of said outer shell to the vehicle body, said flexible portion covering a portion of the vehicle body within an interior of the vehicle.

2. A vehicle roof according to claim 1, further comprising at least one mounting site in said lower layer for an interior component.

3. A vehicle roof according to claim 1, further comprising a roof lining surface sandwiched to a surface of said lower layer facing away from said upper layer.

4. A vehicle roof, in particular a motor vehicle roof,
   which is designed in a sandwiched configuration with a roof skin,
   which is produced separately from a vehicle body, and
   which can be mounted on and securely fixed to a body frame with its roof edges,
   wherein said roof skin is provided with a roof opening and foamed with a layer of an expanded plastic,
   a reinforcement frame surrounding said roof opening being embedded in said layer of expanded plastic, and
   a sun roof frame being fixed to said reinforcement frame.

5. A vehicle roof according to claim 4, wherein said sun roof frame has a flange which abuts directly flush against a lower surface of said reinforcement frame, said flange serving to secure said sun roof frame to said reinforcement frame.

6. A vehicle roof according to claim 4, further comprising a roof lining preformed as an inner shell, said roof lining being spaced apart from said roof skin,
   secured to said sun roof frame affixed beneath said roof skin, and
   designed for covering said body frame and said sun roof frame.

7. A vehicle roof according to claim 6, wherein said inner shell is secured to said sun roof frame by means of an assembly piping which is fitted onto both a flange of said sun roof frame and an edge of an opening of said inner shell.

8. A vehicle roof according to claim 4, wherein water entering via an edge gap between said roof skin and a slide cover is intercepted by said sun roof frame and directed to the outside via a hose or tube piece embedded in a corner area of said sun roof frame in said layer of expanded plastic applied to an underside of said roof skin, said hose or tube piece being sealingly mounted on one side on a drain nozzle of said sun roof frame and ending on the other side with an opening at an outer edge of the vehicle roof.

9. A vehicle roof according to claim 8, wherein said hose or tube piece opens into a water drainage gutter at said outer edge of the vehicle roof, said water drainage gutter being formed between said outer edge of the vehicle roof and an opposing surface of said body frame.

10. A vehicle roof according to claim 4, wherein, to serve the strengthening of the vehicle roof, edges of the vehicle roof are provided with reinforcements in the form of preferably continuous profiles embedded in said layer of expanded plastic in sections of said edges provided for mounting on said body frame.

11. A vehicle roof according to claim 10, wherein a lower free-lying surface of the respective reinforcement abuts directly flush against said body frame.

12. A vehicle roof according to claim 10, wherein the vehicle roof is securely joined to said body frame by fastening screws which pass through a flange of said body frame and are threaded into the respective reinforcement.

13. A vehicle roof according to claim 4, wherein said expanded plastic is a PUR expanded plastic.

14. A vehicle roof, in particular a motor vehicle roof,
   which is designed in a sandwiched configuration with a roof skin,
   which is produced separately from a vehicle body, and which can be mounted on and securely fixed to a body frame with its roof edges, wherein said roof skin is provided with a roof opening for accommodating a slide cover and foamed with a layer of an expanded plastic, and wherein a hose or tube piece is embedded in said layer of foamed plastic, by means of which water entering via anedge gap between said roof skin and said slide cover and intercepted by a sun roof frame fixed beneath said roof skin can be drained off to the outside.

15. A vehicle roof according to claim 14, wherein said hose or tube piece is embedded in a corner area of said sun roof frame in said layer of foamed plastic applied to said roof skin.

16. A vehicle roof according to claim 14, wherein said hose or tube piece is sealingly mounted on one side on a drain nozzle of said sun roof frame and ends on the other side with an opening at an outer edge of the vehicle roof.

17. A vehicle roof according to claim 14, wherein said hose or tube piece opens at an outer edge of the vehicle roof in a water drainage gutter which is formed between an outer edge of said roof skin and an opposing surface of said body frame.

18. A vehicle roof according to claim 14, wherein said layer of foamed plastic applied to said roof skin has a lip formed in the area of an outer edge of the vehicle roof, said lip extending, in the assembled state of the vehicle roof, up until a surface of said body frame facing said outer edge of the vehicle roof.

19. A vehicle roof according to claim 14, wherein, in said layer of foamed plastic applied to said roof skin, a reinforcement frame surrounding said roof opening is embedded, and wherein said sun roof frame is fixed to said reinforcement frame.

20. A vehicle roof according to claim 19, wherein said sun roof frame has a flange which abuts directly flush against a lower surface of said reinforcement frame and serves as means of securing said sun roof frame to said reinforcement frame.

21. A vehicle roof according to claim 14, wherein said expanded plastic is a PUR expanded plastic.

22. A vehicle roof, in particular a motor vehicle roof, which is formed in one piece with a roof lining and can be mounted on and securely fixed to a body frame, wherein said roof lining is provided with sections for covering said body frame, said sections having at least one preinstalled shock absorbing safety element to prevent body parts of vehicle passengers from striking said body frame and to moderate the results of such an impact, respectively.

23. A vehicle roof according to claim 22, wherein said shock absorbing safety element is made of a foamed plastic.

24. A vehicle roof according to claim 22, wherein said roof lining is formed by an inner shell made of a foamed plastic.

25. A vehicle roof according to claim 24, wherein said inner shell has an upper layer and a lower layer, said lower layer forming said sections for covering said body frame.

26. A vehicle roof according to claim 25, wherein said lower layer of said inner shell is designed with thicker walls in partial sections, these thickenings of said lower layer forming said shock absorbing safety elements.

27. A vehicle roof according to claim 25, wherein said inner shell has cavities between said upper layer and said lower layer which form air channels.

28. A vehicle roof according to claim 22, wherein an outer edge of said sections for covering said body frame is joined to a flange of said body frame by a piping.

29. A vehicle roof according to claim 22, wherein an outer edge of said section for covering said body frame is cut or preformed so that it precisely fits said body frame.

30. A vehicle roof according to claim 22, wherein said shock absorbing safety element is a preinstalled airbag.

31. A vehicle roof, comprising, a metallic roof panel which is formed in one piece with a roof lining comprising an inner shell of a foamed plastic, said metallic roof panel defining an outer rim mountable to a vehicle body opening, wherein elastic flexible projecting sections of said roof lining designed for lining a body frame project about an outer periphery defined by the vehicle roof and wherein harder foamed plastics are provided for sections of said inner shell within a periphery of said projecting sections, and wherein desired flexing areas are provided to provide downward bending of said projecting sections and passage through said body opening during the assembly of the vehicle roof.

* * * * *

UNITED STATES PATENT AND TRADEMARK OFFICE
CERTIFICATE OF CORRECTION

PATENT NO. : 6,367,872 B1
DATED : April 9, 2002
INVENTOR(S) : Bohm et al.

It is certified that error appears in the above-identified patent and that said Letters Patent is hereby corrected as shown below:

Column 9,
Line 8, "anedge" should be -- an edge --

Signed and Sealed this

Fourteenth Day of January, 2003

JAMES E. ROGAN
*Director of the United States Patent and Trademark Office*